United States Patent [19]

Arjunan

[11] Patent Number: 5,391,625
[45] Date of Patent: Feb. 21, 1995

[54] COMPATIBILIZED ELASTOMER BLENDS CONTAINING COPOLYMERS OF ISOOLEFINS

[76] Inventor: Palanisamy Arjunan, 16314 Hazey Pine, Houston, Tex. 77059

[21] Appl. No.: 34,436

[22] Filed: Mar. 19, 1993

[51] Int. Cl.$^6$ .................. C08L 19/00; C08L 7/00; C08L 9/00; C08L 11/00; C08L 23/16
[52] U.S. Cl. .................... 525/215; 525/194; 525/221; 525/222; 525/227; 525/211; 525/192; 524/522; 524/523; 524/524
[58] Field of Search ............ 525/215, 227, 222, 221, 525/211, 192, 194

[56] References Cited

U.S. PATENT DOCUMENTS

| | | | |
|---|---|---|---|
| 4,397,987 | 8/1993 | Cornell | 525/75 |
| 4,639,487 | 1/1987 | Hazelton et al. | 525/221 |
| 4,851,468 | 7/1989 | Hazelton et al. | 525/215 |
| 4,957,974 | 9/1990 | Illenda et al. | 525/301 |
| 5,013,793 | 5/1991 | Wang et al. | 525/195 |
| 5,140,072 | 8/1992 | Takeshita | 525/215 |
| 5,162,445 | 11/1992 | Powers et al. | 525/333.4 |
| 5,281,651 | 1/1994 | Arjunan et al. | 525/215 |

FOREIGN PATENT DOCUMENTS 56-047441  4/1981  Japan.

*Primary Examiner*—Carman J. Seccuro, Jr.
*Attorney, Agent, or Firm*—C. L. Bell; M. B. Kurtzman

[57] ABSTRACT

The present invention provides for compatibilized elastomer blend compositions based on a preferred mixture of a copolymer of a $C_4$ to $C_7$ isoolefin, such as isobutylene, copolymerized with a para-alkyl styrene comonomer, such as para-methyl styrene wherein at least some of the alkyl substituent groups present in the styrene monomer units contain halogen, and at least one dissimilar elastomer, said blend composition further containing, as a compatibilizer, minor amounts of a copolymer of ethylene and vinyl acetate or a copolymer of ethylene, a lower alkyl acrylate or methacrylate and, optionally, a third comonomer based on acrylic or methacrylic acid.

27 Claims, No Drawings

COMPATIBILIZED ELASTOMER BLENDS CONTAINING COPOLYMERS OF ISOOLEFINS

BACKGROUND OF THE INVENTION

Field of the Invention

This invention relates to the utilization of copolymers of ethylene and vinyl acetate, copolymers of ethylene, a lower alkyl acrylate or methacrylate and, optionally, a third comonomer based on acrylic or methacrylic acid as a compatibilizing agent in elastomer blends containing a C4 to C7 isoolefin copolymer elastomer and at least one other dissimilar elastomer.

Description of Related Art

Copolymers of a C4 to C7 isoolefin, e.g., isobutylene, and up to about 20 mole % of a multiolefin such as isoprene (butyl rubber) are well known polymer materials whose vulcanizates offer some outstanding properties not possessed by many other diolefin based elastomers. Articles prepared from many cured butyl and halogenated butyl elastomers offer improved resistance to oils and greases as well as resistance to oxygen and ozone degradation. Butyl rubber vulcanizates exhibit good abrasion resistance, excellent impermeability to air, water vapor and many organic solvents, as well as resistance to aging and sunlight. These properties render these materials ideal candidates for one or more applications such as water hoses, organic fluid hoses, components in barrier construction, gaskets, adhesive compositions and various molded articles.

More recently, a new class of halogenated elastomeric interpolymers have been discovered which offer many of the same properties as halogenated butyl rubber, but are even more ozone and solvent resistant and are more readily curable. These materials are the halogenation product of random copolymers of a C4 to C7 isoolefin, such as isobutylene, and a para-alkyl styrene comonomer, preferably containing at least about 80%, more preferably at least about 90% by weight of the para isomer, and wherein at least some of the alkyl substituent groups present in the styrene monomer units contain halogen. Preferred materials may be characterized as isobutylene interpolymers containing the following monomer units randomly spaced along the polymer chain:

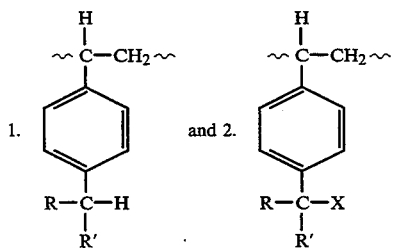

wherein R and R' are independently hydrogen, lower alkyl, preferably C1 to C4 alkyl and X is bromine or chlorine, and wherein the interpolymer is otherwise substantially free of ring halogen or halogen in the polymer backbone chain. Preferably R and R' are each hydrogen. Up to about 60 mole % of the para-alkyl styrene present in the interpolymer structure may be the halogenated structure (2) above.

Most useful of such materials are elastomeric copolymers of isobutylene and para-methylstyrene containing from about 0.5 to about 20 mole % paramethyl styrene wherein up to about 60 mole % of the methyl substituent groups present on the benzyl ring contain a bromine or chlorine atom, preferably a bromine atom. These copolymers have a substantially homogeneous compositional distribution such that at least 95% by weight of the polymer has a paraalkylstyrene content within 10% of the average paraalkylstyrene content of the polymer. They are also characterized by a very narrow molecular weight distribution (Mw/Mn) of less than about 5, more preferably less than about 2.5, a preferred viscosity average molecular weight in the range of from about 300,000 up to about 2,000,000, and a preferred number average molecular weight in the range of from about 50,000 to about 250,000. These copolymers, their method of preparation, their method of cure and graft or functionalized polymers derived therefrom are more particularly disclosed in U.S. Pat. No. 5,162,445, the complete disclosure of which is incorporated herein by reference.

Another elastomer, Neoprene (polychloroprene) rubber (CR), has been the material of choice in most power transmission belts, due to its unique combination of properties: oil resistance, toughness, dynamic flex life, good adhesion to other materials and heat resistance up to 100° C. In the past, CR belts have kept pace with the needs of the automotive industry, but recently there is a need for new materials for more demanding applications. First of all, CR belts are encountering greater heat duress in service due to increasing underhood temperatures (up to 150° C.). Secondly, to meet automotive industry's longer warranty periods ("100,000 mile target"), the CR belts must have a lower failure rate with high mean life, even when high temperatures are not encountered. To meet these emerging needs, improvements in heat, ozone, and cut growth resistance of neoprene belts are desirable.

Nitrile rubber (NBR) is used in automobiles because of its resistance to fuels, a variety of oils and other fluids over a wide range of temperatures. However, nitrile rubber, as such, cannot be used in specific applications requiring heat and ozone resistance. The poor ozone resistance and heat ageing properties of NBR (which is a random copolymer of acrylonitrile and butadiene) are believed to be the result of unsaturation in the backbone of the polymer which permits scission of the polymer chain to occur under certain adverse conditions.

More highly unsaturated rubbers such as natural rubber, polyisoprene, polybutadiene and butadiene/styrene copolymer rubber may exhibit good properties in terms of wear resistance, flexibility, road adhesion and the like, but these materials are also subject to chemical attack and oxygen and ozone degradation, which may limit the useful lifetime of articles prepared from their vulcanizates such as tires, hoses, windshield wipers, gaskets and molded automotive components.

However, the use of butyl, halobutyl or HI-PMS rubber in blends with other elastomers is often limited to those other elastomers which have a mutual compatibility and comparable cure rate behavior with respect to the isobutylene rubber. Thus whereas highly unsaturated elastomers such as polybutadiene or polyisoprene may, in some cases, be reasonably compatible with isobutylene rubber and may be co-vulcanized because of the high availability of sites of ethylenic unsaturation, other elastomers such as polychloroprene, butadiene/acrylonitrile copolymers and like materials containing polar groups along the chain and/or a relatively low degree of ethylenic unsaturation are not so readily co-vulcanized. In the case of blends with these latter elastomers, chemical and ozone resistance may be improved due to the influence of the isobutylene rubber, but often at the expense of a lowering of physical properties such as tensile strength, elongation, modulus and/or abrasion resistance of the co-vulcanizate as compared with the cured elastomer itself.

Furthermore, many rubber compounds contain carbon black as a filler to increase strength, rigidity and other factors. Accordingly, a rubber blend must also be able to incorporate carbon black to be of use in the automotive industry. However, for blends of dissimilar elastomers, problems can arise in achieving optimum carbon black distribution between the microphases of the final product. In blends of elastomers that differ significantly in terms of unsaturation, polarity or viscosity, carbon black tends to locate preferentially in the higher unsaturation, more highly polar or lower viscosity phase.

The role of a compatibilizer in an elastomer blend is manifold: (1) reduce the interfacial energy between the phases, (2) permit a finer dispersion during mixing, (3) provide a measure of stability against gross segregation, and (4) result in improved interfacial adhesion (G. E. Molau, in "Block Copolymers", Ed by S. L. Agarwal, Plenum, N.Y., 1970, p. 79). Two elastomers form a compatible mixture when they have at least one of the following characteristics: (1) Segmental structural identity—For example, a graft or block copolymer of butadiene and styrene is compatible with either polybutadiene or polystyrene; (2) Miscibility or partial miscibility with each other—Solubility parameter difference <1, generally <0.2 units—For example, poly (vinyl chloride), PVC, poly (ethylacrylate), PEA, poly (methylacrylate), PMA, have solubility parameters in the 9.4–9.5 range and form compatible mixtures; (3) Functional groups capable of generating covalent, ionic, donor-acceptor or hydrogen bonds between the polymers.

Compatibilization of dissimilar elastomer blends is an area of active interest from both technological and scientific points of view. Many of the synthetic and natural elastomers have good properties that when combined with other rubbers of similar or complementary properties may yield desirable traits in the products.

Thus, it would be of great importance to the art if a compatibilizer for dissimilar rubber blends such as CR/HI-PMS of NBR/HI-PMS could be found.

Compositions containing ethylene/acrylic or acrylate copolymers are known in the technology. Of tangential interest is U.S. Pat. No. 4,607,074 to Hazelton where a cured rubber, an uncured rubber and a polyolefin are blended. The polyolefin is taught to be a copolymer of ethylene and unsaturated esters of C1 to C4 monocarboxylic acids.

In addition, U.S. Pat. No. 4,307,204 to DuPont discloses an expandable, curable elastomeric sponge composition based on ethylene/propylene/diene terpolymer (EPDM) elastomer or polychloroprene elastomer, which composition further contains a minor amount of an ionomer resin which is an ethylene polymer or copolymer containing at least about 50 mole percent acid functional groups, which groups are at least 50% neutralized by metal ions. These acid-modified ethylene polymers, which may also include acid-modified EPDM terpolymers, are disclosed to improve the balance of curing and expanding properties of the polymer composition when used to prepare cured expanded materials.

Applicant's copending application Ser. No. 07/827,772, filed in the USPTO on Jan. 29, 1992, now U.S. Pat. No. 5,281,651, discloses the use of terpolymers of ethylene, alkyl 10 acrylate and acrylic acid as a compatibilizing agent for blends of dissimilar rubbers such as Neoprene (CR) or nitrile rubbers (NBR) with non polar elastomers such as ethylene/propylene rubber or EPDM rubber based on ethylene/propylene/non-conjugated diene terpolymers.

None of the aforementioned disclosures addresses the development of compatibilized elastomer blends containing isobutylene rubber which not only exhibit improved resistance to ozone or oxygen attack and improved heat stability, but also exhibit a retention and in some cases improvement of important physical properties such as tensile strength, elongation, modulus and resistance to abrasion.

SUMMARY OF THE INVENTION

The present invention provides for compatibilized elastomer blend compositions comprising: (1) an elastomeric copolymer of a C4 to C7 isoolefin, as well as halogenated versions thereof; (2) a compatibilizer; and (3) a dissimilar elastomer. The compatibilizers include copolymers of ethylene and vinyl acetate or copolymers of ethylene, a lower alkyl acrylate or methacrylate and, optionally, a third comonomer based on acrylic or methacrylic acid. The compatibilizers present in the disclosed blends give rise to compositions and vulcanizates having a good balance of physical and chemical properties and improved heat, ozone and oil resistance.

The blends of this invention may be readily compounded, shaped and covulcanized into articles such as drive belts, automotive hoses, gaskets, air springs, molded articles and the like which not only exhibit improved heat, ozone and oil resistance but also have retained or enhanced physical properties such as abrasion resistance, modulus, elongation and tensile strength.

DETAILED DESCRIPTION OF PREFERRED EMBODIMENTS

This invention relates to compatibilized elastomer blends comprising:
(a) isoolefin-paraalkylstyrene interpolymer (also called isoolefin copolymer rubber);
(b) a dissimilar elastomer;
(c) a compatibilizer; and
(d) optionally, carbon black.

A more preferred isoolefin copolymer rubber, preferably having an Mw of at least about 50,000, even more preferrably of at least 100,000, present as a blend component in another embodiment of this invention is a random copolymer of a $C_4$ to $C_7$ isoolefin, such as isobutylene, and a para-alkyl styrene comonomer. The alkyl preferably contains 1 to 9 carbon atoms. An even more prefered embodiment is one where at least some of the alkyl substituent groups present in the styrene monomer units contain halogen, hereinafter referred to as HI-PMS elasomters. Preferred materials may be characterized as isobutylene/para-alkyl styrene interpolymers containing one or both of the monomer units represented by the following structures randomly spaced along the polymer chains:

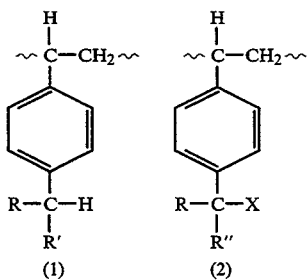

wherein R and R' are independently hydrogen or $C_1$ to $C_4$ alkyl, R" is independently hydrogen, $C_1$ to $C_4$ alkyl or a halogen, and X is a halogen, preferably bromine or chlorine. The interpolymer is preferably otherwise substantially free of any halogen in the polymer backbone chain. In a preferred embodiment at least about 5 mole % of the comonomer units present in the polymer chain are of the structure of formula 2, For the purposes of this invention and the claims thereto, the term isobutylene/para-alkyl styrene interpolymer is herein defined to include, but not be limited to:

a) copolymers comprising isobutylene and a monomer represented by the structure of formula 2 wherein R" is hydrogen or $C_1$ to $C_4$ alkyl, e.g., copolymers of isobutylene and a monohalo-substituted para alkyl styrene;

b) terpolymers comprising isobutylene and a mixture of monomers represented by the structure of formulas 1 and 2 wherein R" is hydrogen or $C_1$ to $C_4$ alkyl, e.g., terpolymers of isobutylene, a para alkyl styrene and a monohalo-substituted para alkyl styrene;

c) terpolymers comprising isobutylene and a mixture of monomers represented by the structure of formula 2 wherein a minor proportion of R" is a halogen, preferably bromine or chlorine, e.g., such as terpolymers of isobutylene, a mono-halo substituted para alkyl styrene and a di-halo substituted para alkyl styrene; and d) tetrapolymers comprising isobutylene and a mixture of monomers represented by the structure of formulas 1 and 2 wherein a minor proportion of R" is a halogen preferably bromine or chlorine, e.g., tetrapolymers of isobutylene, a para alkyl styrene, a monohalo-substituted para alkyl styrene and a dihalo-substituted para alkyl styrene;

(e) copolymers of isobutylene and monomers represented by formula 1;

(f) copolymers comprising isobutlyene and monomers represented by formula 2;

(g) copolymers comprising isobutylene and monomers represented by formula 2 wherein R" is a halogen, preferably bromine or chlorine;

(h) copolymers comprising isobutylene and a mixture of monomers represented by formulas 1 and 2;

(i) termpolymers comprising isobutylene and a mixture of monomers represented by formulas 1 and 2 wherein R" is a halogen.

The halogenated interpolymers are prepared using a copolymer of a $C_4$ to $C_7$ isoolefin and a para-alkyl styrene as the halogenation substrate. Interpolymers having the composition (a), (b), (c), (d), (e), (f), (g), (h) or (i) above will be produced as a function of the severity of the halogenation reaction. For example, mild halogenation will tend to yield interpolymers of the characteristics of (b), stronger halogenation will yield interpolymers of the characteristics of (a) or (d) and even strong halogenation will yield terpolymers having the characteristics of (c).

The most preferred isoolefin copolymer rubbers are random elastomeric brominated terpolymers comprising isobutylene and para-methylstyrene (PMS) containing from about 0.5 to about 20 mole % PMS, more preferably from about 2 to about 15 mole % PMS, wherein up to about 60 mole % of the PMS monomer units contain a monobromomethyl group. These elastomeric copolymers generally exhibit a number average molecular weight in the range of from about 50,000 to about 250,000, more preferably from about 80,000 to about 180,000. From about 5 up to about 60 mole % of the total PMS monomer content of the terpolymer contains a mono-bromomethyl group with essentially no bromination occurring in the polymer backbone or in the aromatic ring. The bromine content of these terpolymers generally ranges from about 0.1 to about 5 mole %.

The dissimilar elastomers used in accordance with this invention include well known polar and non-polar elastomers such as natural rubber, polyisoprene, polybutadiene, copolymers of butadiene with up to 35 wt. % of styrene, ethylene/propylene rubber (EPR) and ethylene/propylene/diene terpolymer rubber based on ethylene, propylene and up to about 10 wt. % of a non-conjugated diene such as 1,4-hexadiene, dicyclopentadiene or ethyl norbornene (EPDM), polychloroprene, nitrile rubber and hydrogenated nitrile rubber. The dissimilar elastomer may also comprise a mixture of two or more of these elastomers.

The invention is especially applicable to blends based on a mixture of HI-PMS elastomer and polychloroprene and/or nitrile rubber because it is with respect to these materials that there exists the greatest need to balance their inherently good oil resistance and adhesive properties with improved ozone resistance and enhanced heat stability inherent in HI-PMS elastomers.

The polychloroprene elastomer used in the elastomer blend in one embodiment of the present invention is a commercially available material, commonly referred to as CR or neoprene rubber. It is available in a number of grades and molecular weights, all of which elastomeric grades are suitable for use in the compositions of this invention. The preferred grade is Neoprene GRT which is more resistant to crystallization and is based on a copolymer of chloroprene and 2,3-dichloro-1,3-butadiene. Neoprene synthesis is also well known in the art. C. A. Hargraves et al., Encyclopedia of Polymer Science and Technology, vol. 3, p. 705-730.

The nitrile rubber used in the elastomer blend in another embodiment of this invention is also a commercial material available in a number of grades. Nitrile rubber is a random copolymer of a major proportion of butadiene and a minor proportion of acrylonitrile and is generally produced by free radical catalysis.

The compatibilizers which are useful in accordance with the present invention include random copolymers of ethylene with from about 4 to about 50% by weight of vinyl acetate (E/VA) or a $C_1$ to $C_4$ lower alkyl acrylate or methacrylate (E/AC). Preferred copolymers are copolymers of ethylene with from about 5 to about 40% by weight methylacrylate or vinyl acetate.

Where the compatiblizer is an E/AC polymer, it may further comprise an acrylate or methacrylate (E/AC- /AA). About 4 to about 50% by weight, more preferably from about 5% to about 35% by weight of the E/AC/AA terpolymer is an acrylate or methacrylate and from about 0.5 to about 10% by weight, more preferably from about 2 to about 8% by weight is acrylic or methacrylic acid, each based on the weight of the terpolymer. The balance of the terpolymer is ethylene. The designations E/AC and E/AC/AA, acrylate and acrylic as used herein refer to co- and terpolymers wherein acrylate includes methacrylate and acrylic includes methacrylic. The term alkyl(meth)acrylate is specifically defined to include alkyl acrylates and alkyl meth acrylates. The term (meth)acrylic acid is specifically defined to include acrylic acid and meth acrylic acid.

The E/VA, E/AC and E/AC/AA interpolymers may comprise a wide variety of melt indicies (MI) generally between about 0.1 to about 30, more preferably between about 1 to about 10, dg/min (ASTM D1238, Condition E).

The E/VA, E/AC and E/AC/AA interpolymers may be produced by any one of a number of well known free radical initiated processes such as, for example, those described in U.S. Pat. No. 3,350,372 which is incorporated by reference for all purposes as if fully set forth. Generally ethylene, vinyl acetate or the (meth)acrylates and the optional (meth)acrylic acids are metered into, for example, a high pressure autoclave reactor along with any one of a number of well known free radical polymerization initiators (catalysts) suitable for producing such ethylene based copolymers. Particularly preferred catalysts include organic peroxides such as, for example, lauryl peroxide, di-tert butyl peroxide, tert butyl peroxide and various azo compounds. Typically, the catalyst will be dissolved in a suitable organic liquid such as benzene, mineral oil, or the like. Ordinarily the catalyst is used at a level of between about 50 to about 20,000, more preferably between about 100 to about 250, ppm based on the weight of monomers.

The isoolefin copolymer rubber may be present in the composition in the broad range of from about 5 to about 95% by weight. Correspondingly, about 95 to about 5 % by weight of one or more dissimilar elastomer(s), based on the total elastomer content of the composition, may be present. More preferably the composition contains from about 30 to about 90% by weight of the dissimilar elastomer, and most preferably from about 50 to about 80% by weight of the dissimilar elastomer, the balance of the elastomer content being the isoolefin copolymer rubber (i.e. about 10 to about 70 wt. % and about 20 to about 50 wt. % isoolefin copolymers are preferred).

The E/VA, E/MA or E/MA/AA interpolymers are incorporated into the elastomer blend at optimum levels to compatibilize the elastomer mixture, but below levels which would seriously detract from the properties of the cured covulcanizate. The compatibilizer may be added at levels ranging from about 1 to about 50 parts by weight per hundred parts by weight of rubber (phr), more preferably from about 5 to about 20 phr and most preferably from about 5 to about 15 phr.

In a preferred embodiment the isoolefin copolymer rubber is typically present at about 5 to 50 parts by weight, more preferably 20 to 40 parts by weight, most preferably 30 to 40 parts by weight. The E/VA, E/AC or E/AC/AA interpolymer is typically present at 1 to 50 phr, more preferably 5 to 20 phr, most preferably 10 phr. The dissimilar elastomer is typically present at 30 to 90 parts by weight, preferably 55 to 85 parts by weight, more preferably 65 to 75 parts by weight, most preferably 70 parts by weight. The optional carbon black may be present at from 3 to 50 parts per 100 parts rubber blend, preferably from about 20 to about 40 parts.

The compositions of the present invention are vulcanizable and may also include conventional mixed vulcanizing systems which are known curatives for isobutylene rubber and the particular dissimilar elastomer present in the blend. Generally such vulcanizing systems may include a metal oxide such as zinc oxide, magnesium oxide and mixtures thereof, used either alone or mixed with one or more organic accelerators or supplemental curing agents such as an amine, a phenolic compound, a sulfonamide, thiazole, a thiuram compound, thiourea or sulfur. Organic peroxides may also be used as curing agents. The zinc or magnesium oxide is normally present at a level of from about 1 to about 10 parts by weight per 100 parts by weight of elastomer blend, and the sulfur and supplemental curing agents or curing accelerators, where used, may be present at a level of from about 0.1 to about 5 parts by weight per 100 parts by weight of the elastomer blend.

The elastomer polymer composition may also contain other additives such as lubricants, fillers, plasticizers, tackifiers, coloring agents, blowing agents, and antioxidants.

Examples of fillers include inorganic fillers such as carbon black, silica, calcium carbonate, talc and clay, and organic fillers such as high-styrene resin, coumarone-indene resin, phenolic resin, lignin, modified melamine resins and petroleum resins.

Examples of lubricants include petroleum-type lubricants such as oils, paraffins, and liquid paraffins, coal tar-type lubricants such as coal tar and coal tar pitch; fatty oil-type lubricants such as castor oil, linseed oil, rapeseed oil and coconut oil; tall oil; waxes such as beeswax, carnauba wax and lanolin; fatty acids and fatty acid salts such as licinoleic acid, palmitic acid, barium stearate, calcium stearate and zinc laurate; and synthetic polymeric substances such as petroleum resins.

Examples of plasticizers include hydrocarbon oils, e.g., paraffin, aromatic and napththenic oils, phthalic acid esters, adipic acid esters, sebacic acid esters and phosphoric acid-type plasticizers.

Examples of tackifiers are petroleum resins, coumarone-indene resins, terpene-phenol resins, and xylene/formaldehyde resins.

Examples of coloring agents are inorganic and organic pigments.

Examples of blowing agents are sodium bicarbonate, ammonium carbonate, N,N'-dinitrosopentamethylenetetramine, azocarbonamide, azobisisobutyronitrile, benzenesulfonyl hydrazide, toluenesulfonyl hydrazide, calcium amide, p-toluenesulfonyl azide, salicylic acid, phthalic acid and urea.

The vulcanizable composition may be prepared and blended on any suitable mixing device such as an internal mixer (Brabender Plasticorder), a Banbury Mixer, a kneader or a similar mixing device.

Blending temperatures and times may range from about 45° to 180° C. and 4 to 10 minutes respectively. After forming a homogeneous mixture of the elastomers and optional fillers, processing aids, antioxidants and the like, the mixture is then vulcanized by the further mixing-in of crosslinking agents and accelerators followed by heating the resulting blend to a temperature of from about 100° to 250° C., more preferably from about 125° to 200° C. for a period of time ranging from about 1 to 60 minutes. Molded articles such as belts and hoses are prepared by shaping the prevulcanized formulation using an extruder or a mold, and subjecting the composition to temperatures and curing times as set forth above or otherwise known to those of ordinary skill in the art.

The following examples are illustrative of the invention. The materials used in the examples described below were as follows:

A. Neoprene GRT is a polychloroprene elastomer marketed by DuPont;

B. ATX 350 is an ethylene/methyl acrylate/acrylic acid terpolymer having a melt index of 6 and available from EXXON CHEMICAL COMPANY under the trade name ESCOR ACID TERPOLYMER comprising 24 wt. % methyl acrylate, 2 wt. % acrylic acid and 74 wt. % ethylene based upon the weight of the copolymers.

C. ATX 320 an ethylene/methyl acrylate/acrylic acid terpolymer having a melt index of 5 and available from EXXON CHEMICAL COMPANY under the trade name ESCOR ACID TERPOLYMER comprised of 18 wt. % methyl acrylate, 6 wt. % acrylic acid and 76 wt. % ethylene based upon the weight of the copolymers.

D. OPTEMA XV53.04 is a copolymer of ethylene and 34 wt. % of methyl acrylate having a melt index of 4 as measured by ASTM D-1238.

E. HI-PMS is a brominated copolymer of isobutylene and para-methyl styrene (PMS) having a PMS content of 5 wt. %, a bromine content of 0.8 wt. % and a Mooney Viscosity of 55±5 as measured by ASTM D-1646 (radial cavity dies)

F. Exxon 502 is a copolymer of ethylene and 38 wt. % of vinyl acetate having a melt index of 4 as measured by ASTM D-1238.

EXAMPLES 1-5

Five blends containing Neoprene GRT, HI-PMS and the components identified in Table 1 (parts by weight) were prepared by mixing the components on a small scale (45 cc) Brabender mixer at a temperature of 110° C. and for a period of 5 minutes. These blend samples were then examined in an optical microscope as thin sections (100-200 nm) using phase contrast such that the Neoprene phase appears black and the HI-PMS phase appears a greyish white.

TABLE 1

| BLEND | NEOPRENE GRT | HI-PMS | ATX 350 | ATX 320 | OPTIMA XV53.04 | EXX 502 |
|---|---|---|---|---|---|---|
| Ex 1 | 67 | 33 | — | — | — | — |
| Ex 2 | 60 | 30 | 10 | — | — | — |
| Ex 3 | 60 | 30 | — | 10 | — | — |
| Ex 4 | 60 | 30 | — | — | 10 | — |
| Ex 5 | 60 | 30 | — | — | — | 10 |

Microscopic examination showed that in all cases in Examples 2-5 the HI-PMS polymer phase was much more finely and uniformly dispersed in the Neoprene matrix phase as compared with control blend of Example 1 which contained no compatibilizer. The HI-PMS phase in Examples 2-5 appears as uniformly dispersed small particles or fibrils having a dimension of less than 10 microns with most particles being less than 2 microns. In the control of Example 1, the HI-PMS phase appeared as poorly dispersed, long fibrils or islands having a dimension in excess of 10 microns, mostly in excess of 50 microns.

Mechanical properties of cured polymer compositions within the scope of this invention and containing ATX 350 and ATX 320 ethylene terpolymers as compatibilizing agents are demonstrated in Examples 6-9 below.

EXAMPLES 6-9

Curable compositions containing the ingredients set forth in Table 2 were prepared.

The compounding ingredients identified by product name in Table 2 are as follows:

| The compounding ingredients identified by product name in Table 2 are as follows: | |
|---|---|
| Octamine | C8-amine; reaction product of diphenylamine and diisobutylene (Uniroyal Chemical Co., Naugatuck, CT) |
| Wingstay ® | 29 disp. - styrenated diphenylamine |
| Wingstay ® | 100 Az - Mixed diaryl-p-phenylenediamine (Good Year Rubber Co., Akron, OH) |
| Aranox ® | p-(polysulfarylamido) diphenylamine (Uniroyal Chemical Co., Naugatuck, CT) |
| MBTS | 2,2'-dibenzothiazyl disulfide (R.T. Vanderbilt Co., Norwalk, CT) |
| TMTDS | Tetramethyl thiuram disulfide (Uniroyal Chemical Co., Naugatuck, CT) |
| DOTG | Diorthotolylguanidine (American Cyanamid Co., Boundbrook, NJ) |
| Santoguard ® PVI | N-cyclohexylthiophthalimide (Monsanto Chemical Co., St. Louis, MO) |

The stearic acid and octamine were mixed with the polymers in a small scale (60 cc) C. W. Brabender at 110° C., 60 rpm for 5 min. The blend samples were removed, cooled under nitrogen and the rest of the ingredients were mixed at 50° C., 50 rpm for 5 min. The blend samples were then cured at 160° C. for 20 minutes to fabricate test specimens (tensile dumbbells, etc.) which were tested after a 24 hour waiting period. Mechanical properties, heat aging, and dynamic ozone resistance were measured using standard (ASTM) conditions.

TABLE 2

| | Ex 6 | Ex 7 | Ex 8 | Ex 9 |
|---|---|---|---|---|
| Neoprene GRT | 100 | 67 | 60 | 60 |
| HI-PMS | — | 33 | 30 | 30 |
| ATX-350 | — | — | 10 | — |
| ATX-320 | — | — | — | 10 |
| Stearic Acid | (1.25 phr) | | | |
| Octamine | (1.0 phr) | | | |
| Wingstay 29 Disp. | (0.715 phr) | | | |
| Wingstay 100 Az | (1.25 phr) | | | |
| Aranox | (0.50 phr) | | | |
| ZnO (Kadox 911) | (2.5 phr) | | | |
| TMTDS | (0.5 phr) | | | |
| DOTG | (0.35 phr) | | | |
| Santoguard PV1 | (0.30 phr) | | | |
| MgO (Maglite D) | (2.0 phr) | | | |
| Physical Properties Cure 20 Min. 160° C.[1] | | | | |
| Tensile MPa | 11.9 | 8.8 | 12.8 | 12.4 |
| Elongation % | 1037 | 957 | 867 | 794 |
| Heat Aged 48 Hr. 140[2] | | | | |
| Tensile | 6.1 | 3.9 | 8.2 | 7.0 |
| Elongation % | 586 | 522 | 532 | 430 |
| Dynamic Ozone Resistance[3] 100 ppm O3, 37.8° C., 30 Cycle/Min. | | | | |

TABLE 2-continued

|  | Ex 6 | Ex 7 | Ex 8 | Ex 9 |
|---|---|---|---|---|
| Hr. to Crack | 120 | 336 | 480 | 384 |

[1] ASTM D-3182-89
[2] ASTM D-573
[3] ASTM D-3395-86 (METHOD A)

As is evident from the data of Table 2, the beneficial effects of compatibilization of 60/30/10 alloys is evident in terms of significant improvement in tensile and ozone resistance when Examples 8 and 9 are compared with the control Neoprene sample of Example 6 and the non-compatibilized blend of Example 7.

EXAMPLES 10–12

Curable compositions containing the same curing system as set forth in Table 2 were formulated and cured by the process set forth in Examples 6–9, except the polymer composition was based on ingredients set forth in Table 3.

TABLE 3

|  | Ex 10 | Ex 11 | Ex 12 |
|---|---|---|---|
| Neoprene GRT | 67 | 60 | 60 |
| H1-PMS | 33 | 30 | 30 |
| Optema XV 53.04 (EMA) | — | 10 | — |
| Exxon 502 (EVA) | — | — | 10 |
| Physical Properties Cure 20 Min., 160° C. | | | |
| Tensile MPa | 8.2 | 12.4 | 10.3 |
| Elongation % | 937 | 1075 | 1060 |
| Heat Aged, 72 Hr., 140° C. | | | |
| Tensile MPa | 5.1 | 8.2 | 7.7 |
| Elongation % | 450 | 570 | 501 |
| Dynamic Ozone Resistance 100 ppm O3, 37.8° C., 30 Cycle/Min. | | | |
| Hr. to Crack | 340 | 460 | 412 |

The enhancement of tensile, elongation and ozone resistance of the compatibilized blends of Examples 11 and 12 is evident from the mechanical property data presented in Table 3.

As is apparent from the foregoing description, he materials prepared and the procedures followed relate to specific preferred embodiments of the broad invention. It is apparent from the foregoing general description and the specific embodiments that, while forms of the invention have been illustrated and described, various modifications can be made without departing from the spirit and scope of the invention. Accordingly, it is not intended that the invention be limited thereby.

What is claimed is:

1. A compatibilized rubber blend composition comprising:
   (a) an interpolymer rubber of a $C_4$ to $C_7$ isoolefin and para-alkylstyrene;
   (b) at least one rubber selected from the group consisting of natural rubber, polyisoprene, polybutadiene, copolymers of butadiene with up to 35 wt. % styrene, ethylene/propylene copolymers, ethylene/propylene/non-conjugated diene terpolymers, polychloroprene, nitrile rubber and hydrogenated nitrile rubber; and
   (c) about 1 to about 50 parts by weight per hundred parts by weight rubber of a compatibilizer selected from polymers comprising:
   (i) ethylene and vinyl acetate;
   (ii) ethylene and a $C_1$ to $C_4$ alkyl (meth) acrylate; or
   (iii) ethylene, a $C_1$ to $C_4$ alkyl (meth) acrylate and (meth) acrylic acid.

2. The composition of claim 1 wherein the interpolymer rubber comprises halogenated para-alkylstyrene.

3. The composition of claim 1, wherein the interpolymer rubber is a halogenated polymer of isobutylene and para-alkylstyrene.

4. The composition of claim 1 wherein the interpolymer rubber is halogenated polymer of a $C_4$ to $C_7$ isoolefin and 0.5 to about 20 mole % of a paraalkylstyrene.

5. The composition of claim 1 wherein the interpolymer rubber is an interpolymer of isobutylene and one or more monomers represented by the formula:

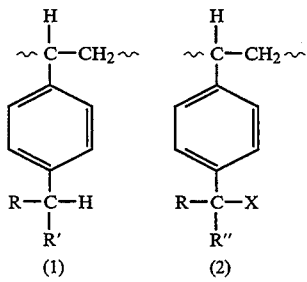

wherein R and R' are independently hydrogen or a $C_1$ to $C_4$ lower alkyl, R" is hydrogen, bromine chlorine or a $C_1$ to $C_4$ lower alkyl and X is bromine or chlorine.

6. The composition of claim 5 wherein the interpolymer rubber is a terpolymer of isobutylene, paramethystyrene and monobromo-para-methyl styrene.

7. The composition of claim 5 wherein from about 5 to about 60 mole % of the para methyl styrene monomer units contain a mono-bromomethyl group.

8. The composition of claim 6 wherein said terpolymer has a bromine content in the range of from about 0.1 to about 5 mole %.

9. The composition of claim 1 wherein the interpolymer rubber is present at 5 to 95 wt. % based upon the weight of the rubber blend.

10. The composition of claim 1 wherein the rubber is present at 95 to 5 wt. % based upon the weight of the rubber blend.

11. The composition of claim 1 wherein the interpolymer rubber is present at 20 to 50 wt. % and the rubber is present at 50 to 80 wt. % based upon the weight of the rubber blend.

12. The composition of claim 1 wherein the compatabilizer is a copolymer of ethylene and up to about 50 wt. % of alkyl (meth) acrylate.

13. The composition of claim 1 wherein the compatibilizer is a copolymer of ethylene and from about 5 to about 40 wt. % of methyl acrylate.

14. The composition of claim 1 wherein the compatibilizer is a terpolymer of ethylene, alkyl (meth) acrylate and (meth) acrylic acid.

15. The composition of claim 1 wherein the compatibilizer is a terpolymer of ethylene, from about 5 to about 35 wt. % of methyl acrylate and from about 0.5 to about 10 wt. % of acrylic acid.

16. The composition of claim 1 wherein the compatibilizer is a copolymer of ethylene and up to about 50 wt. % of vinyl acetate.

17. The composition of claim 1 wherein the compatibilizer is a copolymer of ethylene and from about 5 to about 40 wt. % of vinyl acetate.

18. The composition of claim 1 further comprising carbon black.

19. The composition of claim 1 further containing a vulcanization system.

20. A vulcanizate prepared by curing the composition of claim 1.

21. A compatibilized rubber blend comprising:
(a) from 5 to 95 wt. %, based upon the weight of (a) and (b), of an isobutylene interpolymer rubber comprising para methyl styrene and para bromo methyl styrene;
(b) 95 to 5 wt. % of chloroprene or nitrile rubber;
(c) 1 to 50 parts by weight per hundred parts by weight rubber of a compatibilizer of a copolymer of ethylene and 5 to 40 wt. % methyl acrylate or vinyl acetate based upon the weight of the copolymer or a terpolymer of ethylene and about 5 to 35 wt. % of methyl acrylate and about 0.5 to about 10 wt. % acrylic acid based upon the weight of the copolymer;
(d) optionally, carbon black; and
(e) optionally a vulcanization system.

22. A method for compatibilizing a rubber blend comprising blending:
(a) a $C_4$ to $C_7$ isoolefin-para-alkylstyrene copolymer rubber;
(b) a dissimilar rubber selected from the group consisting of polybutadiene, copolymers of butadiene with up to 35 wt. % styrene, ethylene/propylene copolymers, ethylene/propylene non-congregated diene terpolymers, polychloroprene, nitrile rubber and hydrogenated nitrile rubber; and
(c) about 1 to about 50 parts by weight per hundred parts by weight rubber of a compatibilizer of a polymer comprising ethylene and
(i) vinyl acetate;
(ii) alkyl (meth) acrylate; or
(iii) alkyl (meth) acrylate and (meth) acrylic acid.

23. The method of claim 22, wherein the isoolefin copolymer rubber is an isobutylene/paraalkyl styrene/para bromo alkyl styrene terpolymer.

24. The method of claim 23 wherein the dissimiliar rubber is neoprene or nitrile rubber.

25. The method of claim 22, wherein the compatibilizer is ethylene/methyl acrylate/acrylic acid terpolymer.

26. An article formed from the composition of claim 1.

27. The method of claim 22 wherein the isoolefin copolymer rubber is present at about 5 to about 95 wt. %, the dissimilar rubber is present at about 95 to about 5 wt. %, based upon the weight of the elastomer blend, and the compatibilizer is present at up to about 15 phr.

* * * * *